United States Patent [19]
Comley, Jr. et al.

[11] 3,743,952
[45] July 3, 1973

[54] PHASE SENSITIVE DEMODULATOR

[75] Inventors: William Comley, Jr., Los Angeles; Michael P. Hammontre, Lakewood, both of Calif.

[73] Assignee: McDonnell Douglas Corporation, Santa Monica, Calif.

[22] Filed: Aug. 9, 1971

[21] Appl. No.: 170,132

[52] U.S. Cl. .................. 329/110, 307/232, 328/151, 329/50, 329/112

[51] Int. Cl. .............................................. H03d 3/02

[58] Field of Search .................... 329/110, 112, 122, 329/124, 50; 328/133, 134, 151; 307/232; 332/24, 43 R, 43 B

[56] References Cited

UNITED STATES PATENTS

| | | | |
|---|---|---|---|
| 3,205,454 | 9/1965 | Lowe | 328/151 X |
| 3,154,749 | 10/1964 | Perkins | 329/50 X |
| 3,467,836 | 9/1969 | Thomas | 307/251 X |
| 3,229,230 | 1/1966 | Feldman | 332/43 B X |
| 3,408,581 | 10/1968 | Wakamoto et al. | 328/134 X |
| 3,482,174 | 12/1969 | James | 329/50 X |
| 3,636,458 | 1/1972 | Sugiyama et al | 328/151 |

*Primary Examiner*—Alfred L. Brody
*Attorney*—Walter J. Jason, D. N. Jeu et al.

[57] ABSTRACT

Phase sensitive demodulator including a track and store unit having input, output and switching terminals, and means for producing a phase-shifted switching signal from a carrier to operate the unit. A modulated carrier signal is applied to the input terminal of the unit, and the switching signal is applied to its switching terminal to produce at the output terminal, an output signal which closely approximates the envelope of the modulated carrier signal and, therefore, the original modulating signal. A double-ended embodiment of the demodulator includes a pair of complementary track and store units, and means for producing a corresponding pair of phase-shifted switching signals from a carrier to operate the units in a push-pull mode. Both single-ended and double-ended embodiments of the demodulator are implemented entirely of linear analog and logic devices.

22 Claims, 7 Drawing Figures

INVENTORS
WILLIAM COMLEY JR.
MICHAEL P. HAMMONTRE
BY
Dock N. Jeu

INVENTORS
WILLIAM COMLEY JR
MICHAEL P. HAMMONTRE
BY
-AGENT-

INVENTORS
WILLIAM COMLEY JR.
MICHAEL P. HAMMONTRE
BY
[signature]
-AGENT-

PATENTED JUL 3 1973

3,743,952

SHEET 4 OF 4

INVENTORS
WILLIAM COMLEY JR.
MICHAEL P. HAMMONTREE
BY
Dode N. Jeu
-AGENT-

PHASE SENSITIVE DEMODULATOR

BACKGROUND OF THE INVENTION

Our present invention relates generally to demodulators and, more particularly, to a phase sensitive demodulator possessing a degree of reliability and simplicity not found in prior devices.

In transmitting information defined by a function $f(t)$, it is frequently desirable to transmit such information on a carrier in a way that sign (phase) information is preserved and direct current (d-c) information is not precluded. A suitably modulated carrier signal y can be derived by combining the information signal f(t) with a carrier S (= sin $wt$) by the process of multiplication; i.e., $$y = f(t) \sin wt \tag{1}$$

It is, of course, ultimately necessary to separate the information signal f(t) from the carrier S before it can be utilized. Conventional phase sensitive demodulators which have been used for this purpose include those implemented by means of four-quadrant analog multipliers or bridge switching networks. Such devices are, however, characterized by an output signal $f_o(t)$, prior to filtering, of $$f_o(t) = f(t) \sin^2 wt \tag{2}$$

where $f(t)$ is the desired output signal and $\sin^2 wt$ is the undesired signal component which must be removed by filtering.

Inasmuch as the magnitudes of the output signal and undesired component are equal, it can be seen that the amount of filtering required to reduce the unwanted component to an acceptable level is considerable. Filters capable of accomplishing this are quite costly but, more importantly, they can impose or produce undesirable phase shifts in the pass band of the signal $f(t)$. Moreover, devices of the multiplier type often impose or cause additional phase lag due to the characteristics of the multiplier itself, and are subject to drifts that are both time and temperature dependent.

SUMMARY OF THE INVENTION

Briefly, and in general terms, our invention is preferably accomplished by providing a phase sensitive demodulator which accepts inputs of both a modulated carrier signal and the carrier itself (used as a phase reference) and, employing a tracking and storing mode of operation, yields an accurate output signal of the original, modulating, information signal. The invention is practicably implemented entirely of linear analog and logic devices in either single-ended or double-ended embodiments of the demodulator. Since the demodulator is comprised entirely of linear analog and logic devices, it possesses a degree of reliability and simplicity not found in previous devices. The most important advantages accruing to the present demodulator include (1) significantly lower costs, (2) freedom from frequent adjustments and (3) considerably increased reliability.

Our demodulator broadly includes a track and store unit having input, output and switching terminals, and means for producing a phase-shifted switching signal from the carrier to operate the unit. The modulated carrier signal is applied to the input terminal of the unit, and the switching signal is applied to the switching terminal thereof. The unit is operated in a manner to track and store a peak value of the most recent cycle of the modulated carrier signal. Thus, an output signal which approximates the envelope of the modulated carrier signal is obtained at the output terminal of the unit. A suitably large frequency ratio of the carrier to modulating signal is preferably used whereby the output signal is then practically identical to the envelope of the modulated carrier signal and, therefore, to the original, modulating, information signal.

The demodulator employs a track and store technique which yields a noise component $f_n(t)$ that is proportional to the derivative of its desired output signal $f(t)$, or $$f_n(t) \doteq df(t)/dt \tag{3}$$

This means that in all practical applications where the carrier sin wt is at least ten times higher in frequency than that of the modulating information signal $f(t)$, the noise component is virtually negligible. The small residual noise that remains can be removed simply by a small, first order, filter at the output. In the double-ended embodiment of our demodulator including a complementary pair of similar track and store units, the noise component is further reduced in amplitude and doubled in frequency by the arrangement and push-pull mode of operation of the units.

BRIEF DESCRIPTION OF THE DRAWINGS

Our invention will be more fully understood, and other advantages and features thereof will become apparent, from the following description of certain exemplary embodiments of the invention. The description is to be taken in conjunction with the accompanying drawings, in which.

DESCRIPTION OF THE PRESENT EMBODIMENTS

In the following description and drawings of certain exemplary embodiments of our invention, some specific values of components and types of equipment are disclosed. It is to be understood, of course, that such component values and types of equipment are given as examples only and are not intended to limit the scope of this invention in any manner.

Figure 1:
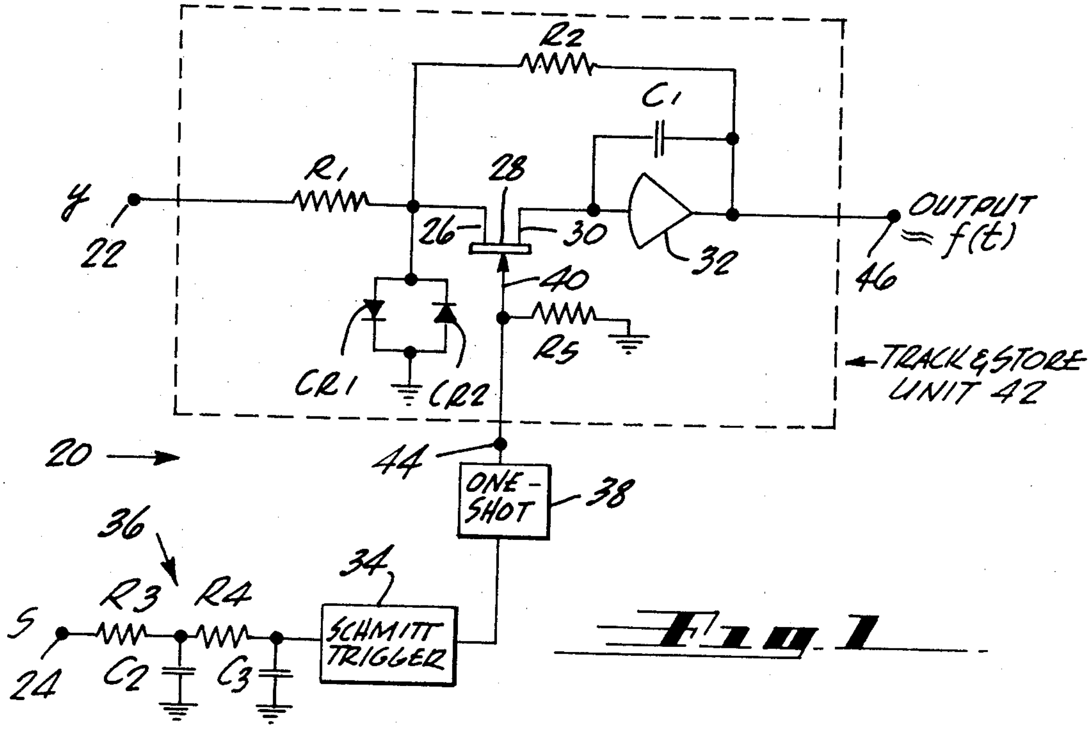
FIG. 1 is a circuit diagram of a single-ended embodiment of our demodulator.

FIG. 1 is a circuit diagram of a single-ended embodiment 20 of our demodulator. A modulated carrier signal $y$ is applied to input terminal 22, and the carrier S is applied to another input terminal 24. The carrier and modulated signal S and y are, for example, of the sinuous forms sin $wt$ and $f(t)$ sin $wt$, respectively. The input terminal 22 is connected by a resistor R1 to the source electrode 26 of a field effect transistor 28, the drain electrode 30 thereof being connected to the input of an operational amplifier 32 having a capacitor C1 as its feedback element. The source 26 is preferably connected to ground through two oppositely oriented unidirectional devices or diodes CR1 and CR2 which provide over-voltage protection of the transistor 28. The output of amplifier 32 is connected back to the source 26 of transistor 28 by a resistor R2. With the very low resistance transistor 28 conducting or effectively out of the circuit, the gain reationship of the amplifier 32 is essentially given by the ratio R2/R1 and the time constant established by R2-C1. Resistor R2 can be equal to resistor R1, for example.

The carrier S at the input terminal 24 is used as a phase reference signal. The terminal 24 is, however, connected to a Schmitt trigger 34 through a lag network 36 including series resistors R3 and R4, and parallel capacitors C2 and C3, arranged as shown in FIG. 1. The phase of the carrier S is shifted 90° by the lag network 36. The output of the Schmitt trigger 34 is applied to the input of a one-shot (monostable) multivibrator 38 and the output of the one-shot is, in turn, applied to the gate electrode 40 of transistor 28. The gate 40 is connected to ground by a bias resistor R5. Resistors R3 and R4 can be equal in resistance and capacitors C2 and C3 can be equal in capacitance, for example.

The single-ended demodulator 20 includes a track and store unit 42 basically comprising the field effect transistor 28 and operational amplifier 32 connected in the circuit indicated in FIG. 1. Terminal 22 connected to resistor R1 is the modulated signal input of the unit 42, terminal 44 connected to the gate 40 of transistor 28 is the switching input of the unit, and terminal 46 connected to the output of amplifier 32 is the demodulated signal output of the unit. The output signal of the one-shot 38 is, of course, derived from the carrier S applied to the input terminal 24 and controls the unit 42 to produce a demodulated output signal from the modulated signal $y$. Since the carrier and modulated signal S and y are of the sinuous forms sin $wt$ and $f(t)$ sin $wt$, respectively, the demodulated output signal is approximately $f(t)$, which is the original information. The demodulator 20 is a simplified and low cost configuration of our invention, and may be practically used where the carrier sin $wt$ is sufficiently higher in frequency than that of the information signal $f(t)$. In such instance, the error or difference between the true and approximate values of $f(t)$ is negligible.

Figure 2:
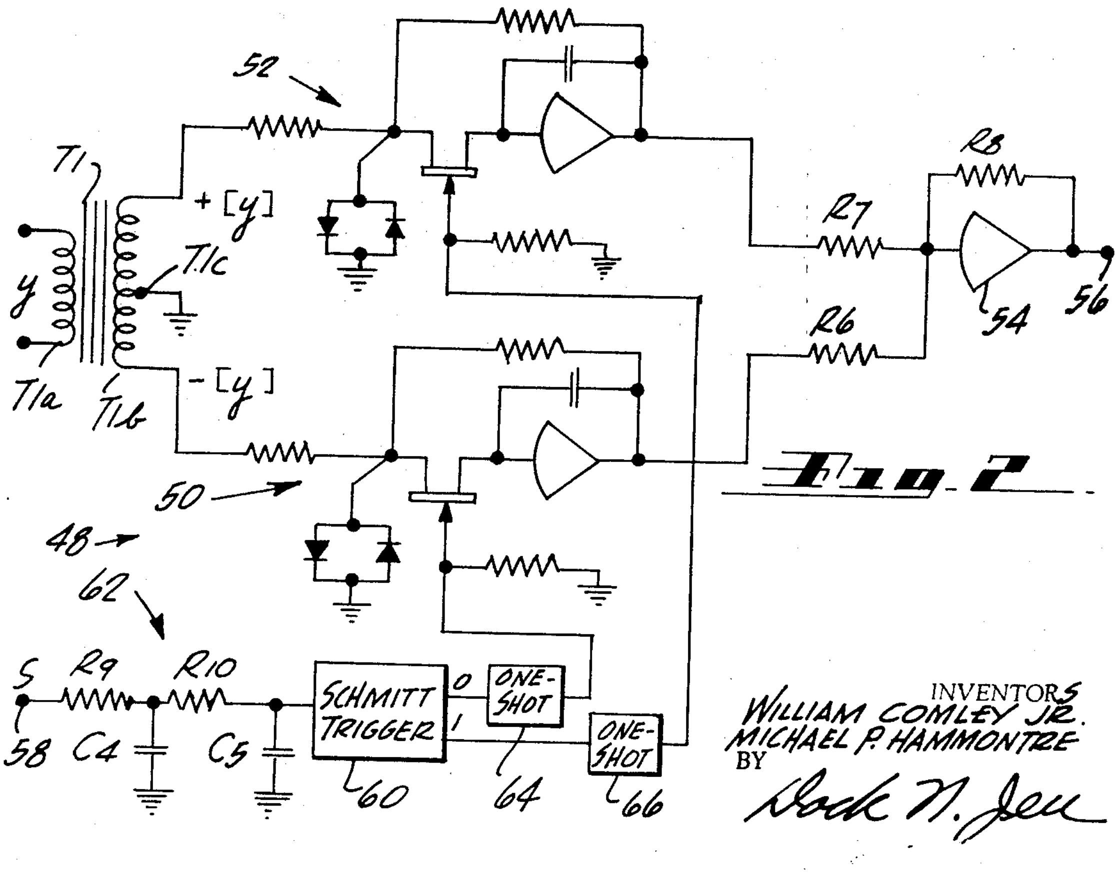
FIG. 2 is a circuit diagram of a double-ended embodiment of the demodulator.

FIG. 2 is a circuit diagram of a double-ended or push-pull embodiment 48 of our demodulator. The modulated carrier signal $y$ is applied to the primary winding T1$a$ of a transformer T1 having a secondary winding T1$b$ with center tap T1$c$ connected to ground. The lower and upper ends of the secondary winding T1b are respectively connected to drive two track and store units 50 and 52 which are substantially identical to the unit 42 shown in FIG. 1. It is, of course, apparent that the two units 50 and 52 are driven by input signals which are 180° out of phase, and are performing identical functions but are proceeding 180° apart. The outputs of the units 50 and 52 are applied respectively to input resistors R6 and R7 of a summing operational amplifier 54 having a feedback resistor R8, to provide a combined output signal at output terminal 56. The resistance of each of the resistors R6 and R7 can be twice that of the resistor R8, for example.

The reference carrier S is applied to an input terminal 58 which is connected to a Schmitt trigger 60 through a lag network 62 including series resistors R9 and R10, and parallel capacitors C4 and C5, arranged similarly to the elements of the network 36 shown in FIG. 1. The complementary outputs labeled 0 and 1 of the Schmitt trigger 60 are connected respectively to the inputs of one-shots 64 and 66, the outputs of which are connected to the switching inputs of the units 50 and 52. Where the carrier and modulated signal S and $y$ are of the sinuous forms sin $wt$ and $f(t)$ sin wt, respectively, the output terminal 56 provides the demodulated information signal $f(t)$.

Figure 3:
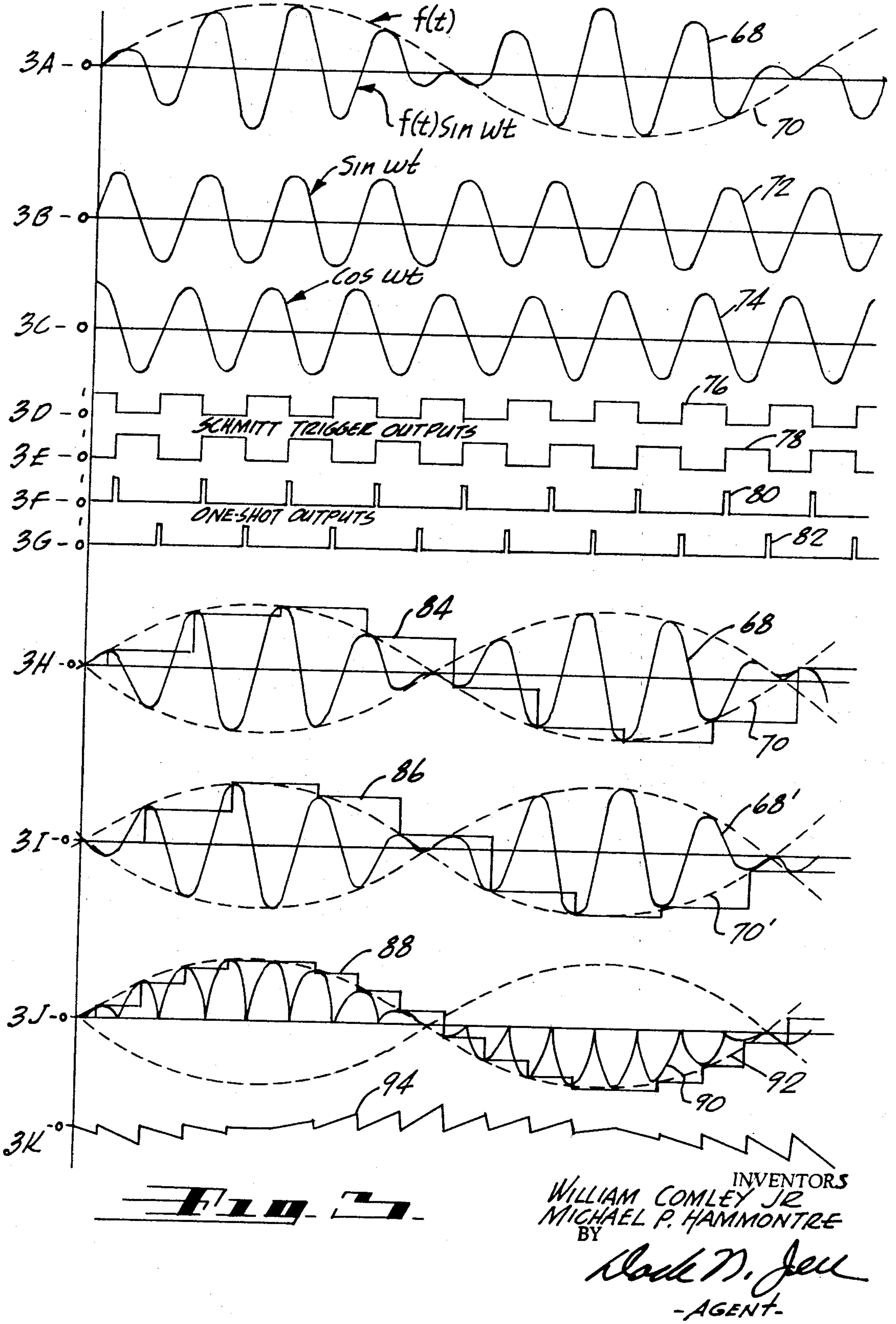
FIG. 3 is a graph showing plots of various signals applied to, and produced in, the demodulators of FIGS. 1 and 2.

FIG. 3 is a graph showing plots of various signals applied to, and produced in, the demodulators 20 and 48 of FIGS. 1 and 2. The plot 3A includes a curve 68 which illustrates the waveform of the modulated carrier signal $y$ (=$f(t)$ sin $wt$). The modulating information signal $f(t)$ is, of course, the envelope of the modulated signal and is indicated by the broken line curve 70. The plot 3B includes a curve 72 which illustrates the waveform of the carrier S (= sin $wt$). The carrier and modulated signal S and y are respectively applied to the input terminals 24 and 22 in FIG. 1 and, similarly, to primary winding T1a and terminal 58 in FIG. 2.

The carrier S is shifted 90° by the lag network 36 in FIG. 1 and, similarly, by the lag network 62 in FIG. 2. Thus, with the carrier sin $wt$, an input signal cos $wt$ is provided to each of the Schmitt triggers 34 and 60 in FIGS. 1 and 2. The plot 3C includes a curve 74 which illustrates the waveform of the input signal cos wt to the Schmitt triggers 34 and 60. It is noted that the curve 74 has a zero (abscissa) crossing which coincides with the peak of each cycle of the modulated carrier signal curve 68 in the plot 3A.

The plot 3D of FIG. 3 includes a curve 76 illustrating the waveform of the output signal from the Schmitt trigger 34 of FIG. 1 and from the output 1 of the Schmitt trigger 60 of FIG. 2. The complementary output 0 of the Schmitt trigger 60 provides an output signal having a waveform as illustrated by curve 78 in the plot 3E. The output signal from the Schmitt trigger 34 of FIG. 1 is applied to the one-shot 38 which produces the output signal having the waveform of curve 80 in the plot 3F of FIG. 3. The output signal from the output 1 of the Schmitt trigger 60 of FIG. 2 is applied to the one-shot 66 which produces an output signal having a similar waveform as the curve 80 in the plot 3F. The output signal from the complementary output 0 of the Schmitt trigger 60, however, produces an output signal having the waveform of curve 82 in the plot 3G of FIG. 3.

The field effect transistor 28 shown in FIG. 1 is normally nonconducting. The amplitude of the modulated signal $y$ usually has a swing between −10 and +10 volts, although wide variations in amplitude swings can be encountered when the demodulator 20 is used in different applications. The transistor 28 can conduct when its source 26 is a few volts greater than the gate 40. This is, however, precluded by the (silicon) diodes CR1 and CR2 which become respectively conductive at voltages greater than approximately +0.5 and −0.5 volt, with respect to ground. Thus, when the transistor 28 is nonconducting, its source 26 is prevented from exceeding ±0.5 volt with respect to ground.

The transistor 28 is turned on momentarily by the very short duration output pulses from the one-shot 38. Each pulse width is, for example, 50 microseconds wide. When the transistor 28 conducts, it has an extremely low resistance such that the diodes CR1 and CR2 are effectively connected to a current node which is at virtual ground potential and can then be effectively disregarded in the circuit, and the capacitor C1 is quickly charged to the instantaneous value of the modulated signal *y*. At the end of the output pulse signal of the one-shot 38, the transistor 28 again becomes nonconducting and the cycle is repeated with the next output pulse signal from the one-shot. While the transistor 28 is nonconducting, the capacitor C1 holds the last instantaneous value of the modulated signal *y* and this value appears on the output terminal 46. Thus, the unit 42 periodically samples or tracks and stores peak values of the modulated signal y. This function is similarly performed by the upper unit 52 in the demodulator 48 of FIG. 2.

The plot 3H in FIG. 3 includes a curve 84, and reproductions of the curves 68 and 70 shown in the plot 3A. The curve 84 represents the output signal from the unit 42 of FIG. 1 or the unit 52 of FIG. 2. It can be readily seen that the curve 84 tracks and stores the first peak value of each cycle of the curve 68 in discrete steps. The resultant curve 84 clearly approximates the broken line curve 70 which is the envelope of the curve 68. Since curve 70 represents the original modulating information signal $f(t)$, it is apparent that the curve 84, or the output signal from the unit 42 of FIG. 1 or the unit 52 of FIG. 2, approximates such original signal. The gross size of the steps in the resultant curve 84 is due to an unrealistic frequency ratio of carrier S and modulating signal $f(t)$. This ratio was, however, adopted only for graphical clarity of illustration. In actual practice, the carrier frequency is at least 10 times higher than the modulating frequency.

The units 50 and 52 of FIG. 2 are substantially identical in structure and perform essentially identical functions. The units 50 and 52 are, however, driven by respective input signals which are 180° out of phase with respect to each other. The two units 52 and 50 are also placed in a track mode alternately, one on the positive and the other on the negative half cycle of the carrier signal S, by the respective output signals of the one-shots 66 and 64. The output signals of the one-shots 66 and 64 differ in phase by 180° as illustrated by the curves 80 abd 82 in the plots 3F and 3G, respectively. Thus, the unit 50 performs a function identical to that of the unit 52 but is tracking and storing the second peak value of each cycle of the modulated carrier signal *y* instead of the first peak value of each cycle thereof. Of course, a negative (or positive) second peak value of each cycle of the modulated carrier signal *y* is oppositely positive (or negative) with respect to ground at the input of unit 50 when it is turned on by the output signals of the one-shot 64.

The plot 3I in FIG. 3 includes a curve 86 which is generally similar to the curve 84 of plot 3H, and curves 68' and 70' which are respectively similar to the curves 68 and 70 of plot 3H except that the curve 68' is 180° out of phase with respect to curve 68. The curve 86 represents the output signal from the unit 50 of FIG. 2, and the curve 68' represents the modulated carrier input signal $(-y)$ to such unit. It can be readily seen that the curve 86 tracks and stores the peak values of the curve 68'. The resultant curve 86 clearly approximates the broken line curve 70' which is the envelope of the curve 68'. Since the curve 70' also represents the original modulating information signal $f(t)$, it is apparent that the curve 86 or the output signal from the unit 50, approximates such original signal.

When the output signals of the units 50 and 52 are combined by the summing operational amplifier 54 in FIG. 2, a summed output signal as illustrated by curve 88 in the plot 3J of FIG. 3 is obtained. Curve 90 in the plot 3J depicts the sampled half wave cycles of both of the modulated carrier input signals $+y$ and $-y$ applied respectively to the units 52 and 50. A broken line curve 92 which is identical to the broken line curves 70 and 70' in the plots 3H and 3I, respectively, represents the envelope of the sampled half wave cycles of curve 90. The curve 88 closely approximates the and envelope curve 92 and, therefore, the summed output signal from the summing amplifier 54 closely approximates the original, modulating, information signal $f(t)$.

It may now be seen that two important advantages have been obtained with the double-ended embodiment 48 of our demodulator. First, the number of zero order hold steps comprising a cycle of the information signal $f(t)$ has been doubled and, second, the magnitude of the instantaneous error has been reduced by one half. Both of these effects result in a substantial improvement in performance. The reduced error, or residual noise, is illustrated by the curve 94 in the plot 3K of FIG. 3 and can be more effectively filtered without introducing adverse phase lag in the pass band of the modulating information signal $f(t)$.

Figure 4:
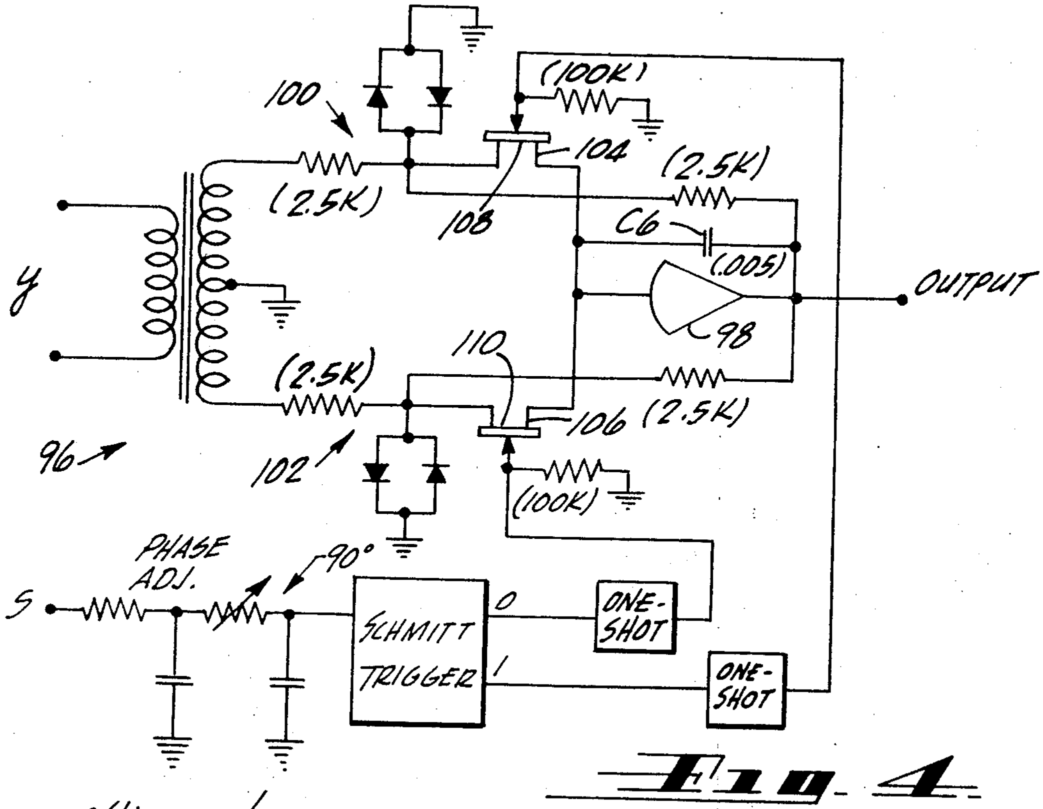
FIG. 4 is a circuit diagram of another version of the double-ended embodiment of our demodulator.

FIG. 4 is a circuit diagram of another version of a double-ended embodiment 96 of our demodulator. This is a particularly practical configuration wherein a single operational amplifier 98 is used in both track and store units 100 and 102 of the demodulator 96. This results in lower fabrication costs, greater simplicity and in improved reliability. The phase sensitive, suppressed carrier, demodulator 96 is substantially identical to the demodulator 48 of FIG. 2 up to the drain electrodes 104 and 106 of the field effect transistors 108 and 110. The drains 104 and 106 are both connected to the input of the operational amplifier 98 with its feedback capacitor C6, and a combined output signal is provided by the output of the amplifier.

The units 100 and 102 are operated on alternate half cycles of the modulated carrier signal *y*, and the output signal from the amplifier 98 closely approximates the original, modulating, information signal $f(t)$. Actually, in all embodiments of our invention, the output signals thereof are essentially equal to the original information signal $f(t)$ for all practical purposes with the use of a suitably high frequency ratio of the carrier S and modulating signal $f(t)$. This is especially true with a double-ended embodiment of the demodulator.

Figure 5:
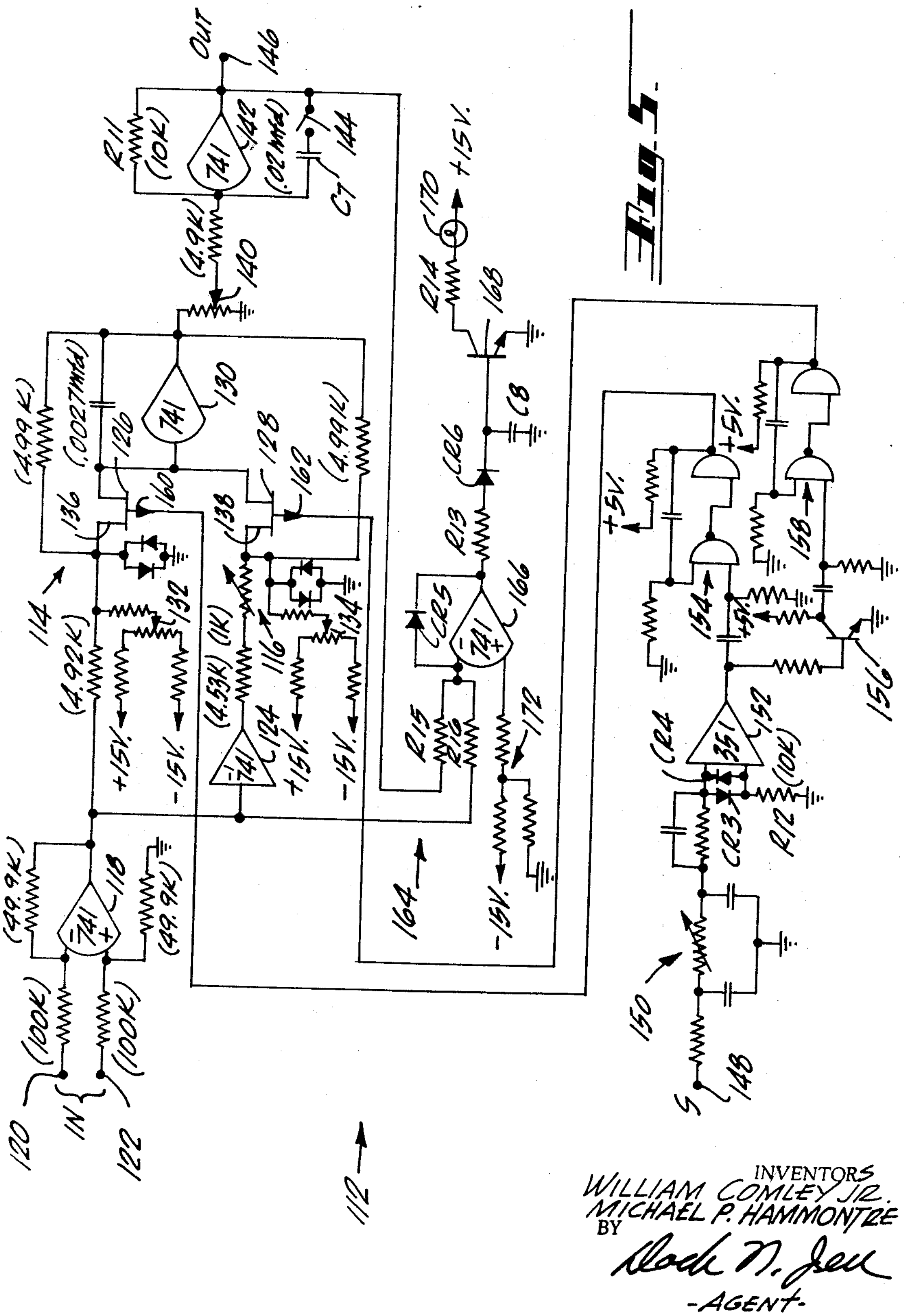
FIG. 5 is a circuit diagram of yet another version of the double-ended embodiment of the demodulator.

FIG. 5 is a detailed circuit diagram of yet another version of a double-ended embodiment of our demodulator. A high input impedance demodulator 112 which is basically similar to the demodulator 96 of FIG. 4 is shown. Instead of using a transformer input device to track and store units 114 and 116, however, a differential input operational amplifier 118 with input terminals 120 and 122 is utilized. The amplifier 118 has a high input impedance and, of course, a very low output impedance. The output of the amplifier 118 is applied directly to the unit 114 and through an inverter 124 to the unit 116. The units 114 and 116 are respectively similar to the units 100 and 102 of FIG. 4, and include field effect transistors 126 and 128 connected to the same operational amplifier 130.

The units 114 and 116 additionally include respective potentiometers 132 and 134 having their adjustable wipers resistively connected to source electrodes 136 and 138 of the transistors 126 and 128. The potentiometers 132 and 134 are used to balance out any direct current (d-c) offsets that may occur in the amplifier 118 and inverter 124. The output of the amplifier 130 is connected to a scaling potentiometer 140 having its wiper resistively connected to an output operational amplifier 142. The output amplifier 142 includes feedback resistor R11 and capacitor C7. The capacitor C7 is, however, normally disconnected from the feedback circuit by switch 144. The capacitor C7 serves as a filter element and, when connected in the circuit by switch 144, smooths out the steps of the output signal appearing on output terminal 146.

The carrier input terminal 148 is connected by a 90° phase shift network 150 to a Schmitt trigger 152 which is constructed from, for example, a type 351 Analog Devices Corporation comparator circuit. A resistor R12 connected to ground provides a zero voltage reference and functions as part of the Schmitt trigger 152. Diodes CR3 and CR4 are protective devices connected across the input of the comparator circuit and serve a similar purpose as the oppositely oriented diodes used with the field effect transistors to limit the input swing. The output of the Schmitt trigger 152 is coupled directly to one-shot 154 and through inverter 156 to one-shot 158. As shown in FIG. 5, each of the one-shots 154 and 158 can be constructed from a pair of Texas Instruments type SN 5400N nand gates, for example. The output signals from the one-shots 154 and 158 are respectively applied to the gate electrodes 160 and 162 of the transistors 126 and 128.

An overload warning circuit 164 is provided in the demodulator 112 of FIG. 5. This circuit 164 includes a differential input operational amplifier 166 with a diode CR5 feedback element, series resistor R13, rectifier diode CR6, storage or filter capacitor C8, transistor amplifier 168, and a load resistor R14 and indicating lamp 170. The feedback diode CR5 is oriented so as to limit the negative output voltage of the amplifier 166 to approximately 0.5 volt. The output of the output operational amplifier 142 is connected to the inverting input of the warning operational amplifier 166 by a resistor R15. The output of the input operational amplifier 118 is connected to the same inverting input by another resistor R16. The non-inverting input of the amplifier 166 is connected to a negative reference voltage through a resistor network 172.

In operation, the output voltage of the output amplifier 142 can be adjusted by the scaling potentiometer 140 to a range of ±10 volts, for example. The input voltage (as provided from a synchro or the like) to the input amplifier 118 can also be in the range of ±10 volts. By selecting suitable values of input and feedback resistors, a gain of 0.5 can be obtained so that the output voltage of amplifier 118 is placed in the range of ±5 volts. The values of the resistors R15 and R16 are also suitably selected to provide appropriate gain relationships for the respective ranges of input voltages thereto. The resistors R15 and R16 can have respective resistances of 10 and 5.1 kilohms, for example. A reference voltage of, for example, −10 volts is provided at the non-inverting input of the amplifier 166 so that its output is normally negative.

When the output voltage of the output amplifier 142 exceeds approximately −10 volts, however, a positive output voltage appears on the output of the amplifier 166 during the negative half cycle such that the diode CR6 conducts and charges the capacitor C8 positively. The transistor 168 is thereby rendered conducting and the overload lamp 170 is energized. On the positive half cycle, the output of the amplifier 166 remains negative and the feedback diode CR5 conducts to limit the output to approximately −0.5 volt. During this time, the capacitor C8 discharges slowly and maintains the transistor 168 on until the next negative half cycle when it is recharged. The operation of the remainder of the demodulator 112 is, of course, similar to that of corresponding parts of the demodulators 48 and 96 of FIGS. 2 and 4, respectively.

Figure 6A:
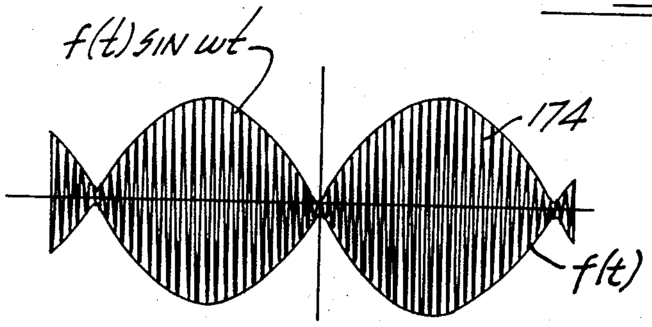
FIGS. 6A and 6B are graphs showing respective plots of a modulated carrier input signal applied to the demodulator of FIG. 5 and the demodulated output signal obtained therefrom.
Figure 6B:
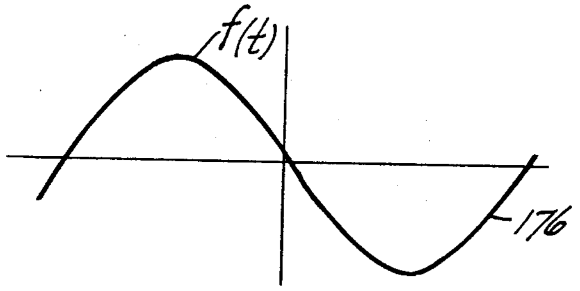

FIGS. 6A and 6B are graphs including respective curves 174 and 176 illustrating an input signal $y$ or modulated carrier $f(t)$ sin $wt$ applied to the demodulator 112 of FIG. 5 and the (unfiltered) output signal $f(t)$ obtained therefrom. The frequency ratio of the carrier S or sin wt to its modulating information signal $f(t)$ was 100 to 1 in this instance. The carrier and input signal S and $y$ are, of course, respectively shown by the high frequency modulated waves and the lower frequency envelope curves in FIG. 6A. It can be seen from FIG. 6B that curve 176 or the output signal from the demodulator 112 is an accurate reproduction of the modulating information signal $f(t)$.

Our invention may be used in aircraft instrumentation systems where 400 c.p.s. carrier systems are frequently utilized and demodulation is required. It can also be used to provide the phase sensitive demodulation required in hybrid A.C./D.C. servo systems. With advancements in the state of the electronic art, the device can serve as a detector in double side band suppressed carrier communications systems.

While certain exemplary embodiments of this invention have been described above and shown in the accompanying drawings, it is to be understood that such embodiments are merely illustrative of, and not restrictive on, the broad invention and that we do not desire to be limited in our invention to the details of construction or arrangements shown and described, for obvious modifications may occur to persons skilled in the art.

We claim:

1. A phase sensitive demodulator for demodulating a modulated carrier signal produced by modulating a carrier with an information signal, said demodulator comprising:

means for tracking and storing the instan-taneous value of said modulated signal, said track and store means including input, output and switching terminals and having said modulated signal applied to said input terminal and providing the instantaneously stored value of said modulated signal at said output terminal; and means for producing a switching signal from said carrier, said switching signal including periodic short duration pulses derived from respective cycles of said carrier, each of said pulses being produced at a predetermined polarity peak of a corresponding cycle of said carrier, and said switching signal being applied to said switching terminal to operate said track and store means, said switching signal producing means comprising means for shifting the phase of said carrier by 90°means for producing a squared signal from said shifted carrier, and means for pro-ducing said short duration pulses from respective cycles of said squared signal, and said track and store means comprising an input resistor having an end connecting with said input terminal, an integrating operational amplifier having an input and an output connecting with said output terminal, a feedback resistor connecting said amplifier output to the other end of said input resistor, and switching means for connecting said amplifier input directly to said other end of said input resistor, said switching means including a field effect transistor having a very low resistance when rendered conductive by each of said switching pulses, and said switching means being normally open and operatively responsive to said switching pulses to connect said amplifier input periodically to said input resistor whereby said amplifier tracks the value of said modulated signal when said switching means is closed and stores the last sampled value of said modulated signal when said switching means is open, to produce an output signal at said output terminal approximating the envelope of said modulated signal whereby said information signal is substantially obtained.

2. The invention as defined in claim 1 wherein said squared signal producing means includes a Schmitt trigger, and said short duration pulse producing means includes a one-shot multivibrator.

3. The invention as defined in claim 2 further comprising means for protecting said transistor from overvoltages applied thereto, said protective means including a pair of oppositely oriented diodes connecting said other end of said input resistor to ground.

4. A double-ended phase sensitive demodulator for demodulating a modulated carrier signal produced by modulating a carrier with an information signal, said demodulator comprising:

first means for tracking and storing the instantaneous value of said modulated signal, said first track and store means including first input, output and switching terminals and having said modulated signal applied to said first input terminal and providing the instantaneously stored value of said modulated signal at said first output terminal;

second means for tracking and storing the instantaneous value of said modulated signal, said second track and store means including second input, output and switching terminals and having said modulated signal applied in opposite phase to said second input terminal and providing the instantaneously stored value of said opposite phase modulated signal at said second output terminal; and means for producing first and second switching signals from said carrier, said first switching signal being applied to said first switching terminal to operate said first track and store means to produce a first output signal at said first output terminal and said second switching signal being applied to said second switching terminal to operate said second track and store means to produce a second output signal at said second output terminal, said second output signal complementing said first output signal and providing a combined output signal closely approximating the envelope of said modulated signal whereby said information signal can be substantially obtained.

5. The invention as defined in claim 4 wherein each of said first and second switching signals includes periodic short duration pulses derived from respective cycles of said carrier, each of said pulses of said first switching signal being produced at a positive peak of a corresponding cycle of said carrier and each of said pulses of said second switching signal being produced at a negative peak of a corresponding cycle of said carrier.

6. The invention as defined in claim 5 wherein each of said first and second track and store means comprises an input resistor having an end connecting with said corresponding input terminal, an integrating operational amplifier having an input and an output connecting with said corresponding output terminal, a feedback resistor connecting said integrating amplifier output to the other end of said input resistor, and switching means for connecting said integrating amplifier input to said other end of said input resistor, said switching means being normally open and operatively responsive to said switching pulses to connect said integrating amplifier input periodically to said input resistor whereby said integrating amplifier tracks the value of said modulated signal when said switching means is closed and stores the last sampled value of said modulated signal when said switching means is open, to produce an output signal at said corresponding output terminal approximating the envelope of said modulated signal.

7. A double-ended phase sensitive demodulator for demodulating a modulated carrier signal produced by modulating a carrier with an information signal, said demodulator comprising:

first means for tracking and storing the instantaneous value of said modulated signal, said first track and store means including first input, output and switching terminals and having said modulated signal applied in one phase to said first input terminal and providing the instantaneously stored value of said modulated signal at said first output terminal;

second means for tracking and storing the instantaneous value of said modulated signal, said second track and store means including second input, output and switching terminals and having said modulated signal applied in an opposite phase to said second input terminal and providing the instantaneously stored value of said opposite phase modulated signal at said second output terminal; and means for producing first and second switching signals from said carrier, said first switching signal being applied to said first switching terminal to operate said first track and store means to produce a first output signal at said first output terminal and said second switching signal being applied to said second switching terminal to operate said second track and store means to produce a second output signal at said second output terminal, said second output signal complementing said first output signal and providing a combined output signal closely approximating the envelope of said modulated signal whereby said information signal can be substantially obtained, each of said first and second switching signals including periodic short duration pulses derived from respective cycles of said carrier, each of said pulses of said first switching signal being produced at a positive peak of a corresponding cycle of said carrier, and each of said pulses of said second switching signal being produced at a negative peak of a corresponding cycle of said carrier, and said first and second track and store means comprising first and second input resistors each having an end connecting with a corresponding one of said first and second input terminals, a single integrating operational amplifier having an input and an output and connected in both of said first and second track and store means for producing and combining said first and second output signals into said combined output signal, first and second feedback resistors connecting said integrating amplifier output to the other end of a corresponding one of said first and second input resistors, and first and second switching means for connecting said integrating amplifier input to said other end of a corresponding one of said first and second input resistors, said first and second output terminals being combined into a single output terminal connected to said integrating amplifier output, and said first and second switching means being normally open and responsive to said first and second pulses, respectively, to connect said integrating amplifier input periodically to said first and second input resistors whereby said integrating amplifier tracks the value of said modulated signal when one of said switching means is closed and stores the last sampled value of said modulated signal when both of said switching means are open, to produce said combined output signal at said integrating amplifier output approximating the envelope of said modulated signal.

8. The invention as defined in claim 7 further comprising means for detecting an overload condition in said demodulator.

9. The invention as defined in claim 5 further comprising a summing operational amplifier having an input and an output, and first and second adder resistors respectively connecting said first and second output terminals to said summing amplifier input whereby said first and second output signals are summed by said summing amplifier to provide said combined output signal at its output.

10. The invention as defined in claim 6 further comprising a summing operational amplifier having an input and an output, and first and second adder resistors respectively connecting said first and second output terminals to said summing amplifier input whereby said first and second output signals are summed by said summing amplifier to provide said combined output signal at its output.

11. The invention as defined in claim 7 further comprising a transformer means for applying said modulated signal in one phase to said first input terminal and in an opposite phase to said second input terminal.

12. The invention as defined in claim 7 further comprising a differential input operational amplifier, and an inverter, said differential amplifier applying said modulated signal in one phase to said first input terminal and to said inverter which applies said modulated signal in an opposite phase to said second input terminal.

13. The invention as defined in claim 7 further comprising an output filter operational amplifier connecting said integrating amplifier output to said single output terminal, said filter amplifier including a capacitor electively connectable in a feedback circuit thereof to smooth out steps in said combined output signal appearing at said single output terminal.

14. A double-ended phase sensitive demodulator for demodulating a modulated carrier signal produced by modulating a carrier with an information signal, said demodulator comprising:

means for tracking and storing the instantaneous value of said modulated signal, said track and store means including first and second input means, storing means, and first and second switching means for respectively connecting said first and second input means to said storing means, said first input means having said modulated signal applied in one phase thereto and said second input means having said modulated signal applied in an opposite phase thereto, and said first and second switching means being normally open and operatively responsive respectively to applied first and second switching signals to connect said first and second input means periodically to said storing means; and means for producing said first and second switching signals from respective polarity portions of each cycle of said carrier, said first and second switching signals being alternately applied to said first and second switching means to operate the same and provide the instantaneous value of said modulated signal to said storing means which tracks the value of said modulated signal when either of said first and second switching means is closed and stores the last sampled value thereof when both of said first and second switching means are open, whereby said modulated signal is sampled twice for each cycle of said carrier and said storing means provides an output signal closely approximating the envelope of said modulated signal so that said information signal can be accurately obtained.

15. The invention as defined in claim 14 further comprising means for detecting an overload condition in said demodulator.

16. The invention as defined in claim 14 wherein said first and second input means comprises first and second input resistors, said storing means comprises an integrating operational amplifier including first and second feedback resistors connecting its output to respective common junctions between said first and second input means and said first and second switching means, and said first and second switching means comprises first and second field effect transistors which have a very low resistance when rendered conductive respectively by said first and second switching signals.

17. The invention as defined in claim 16 wherein said first switching signal includes periodic short duration pulses derived from corresponding portions of one polarity of said cycles of said carrier and said second switching signal includes periodic short duration pulses derived from corresponding portions of an opposite polarity of said cycles of said carrier, and said first and second switching signals producing means includes means for shifting the phase of said carrier by 90°, means for producing first and second squared signals of opposite phases from said shifted carrier, and means for producing said short duration pulses of said first switcing signal from respective cycles of said first squared signal and of said second switching signal from respective cycles of said second squared signal.

18. The invention as defined in claim 17 wherein said first squared signal producing means comprises a Schmitt trigger, said second squared signal producing means comprises a squared signal inverter connected to the output of said Schmitt trigger, and said short duration pulse producing means comprises first and second one-shot multivibrators responsively connected respectively to said Schmitt trigger and said squared signal inverter.

19. The invention as defined in claim 16 further comprising first and second means for protecting said first and second transistors respectively from overvoltages applied thereto, said first and second protective means including first and second pairs of oppositely oriented diodes connecting respective common junctions between said first and second input means and said first and second switching means to ground.

20. The invention as defined in claim 19 further comprising a differential input operational amplifier, and a differential signal inverter, said differential amplifier applying said modulated signal in one phase to said first input means and to said differential signal inverter which applies said modulated signal in an opposite phase to said second input means.

21. The invention as defined in claim 20 further comprising an output filter operational amplifier connected to said integrating amplifier output, said filter amplifier including a capacitor electively connectable in a feedback circuit thereof to smooth out steps in said output signal of said integrating amplifier.

22. The invention as defined in claim 21 further comprising means for detecting an overload condition in said demodulator.

* * * * *